Feb. 2, 1960     L. C. DEAN     2,923,412
AUTOMOBILE HAT HOLDER
Filed June 9, 1955
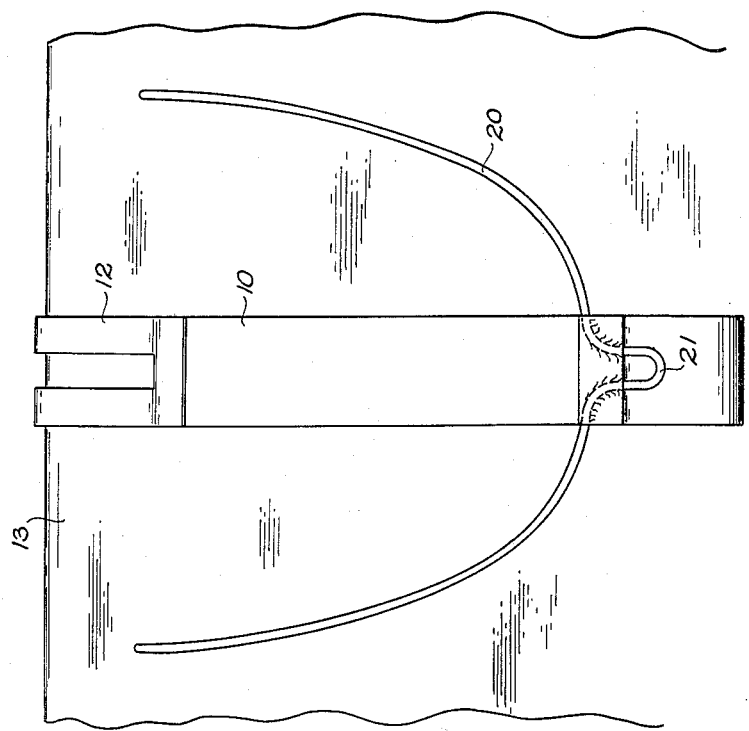
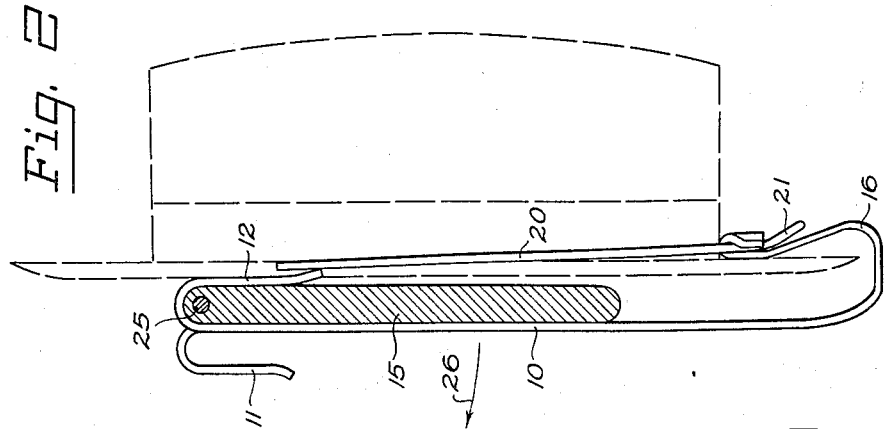
LURA C. DEAN
INVENTOR.
BY D. Carl Richards
ATTORNEY

2,923,412
AUTOMOBILE HAT HOLDER
Lura C. Dean, Muscatine, Iowa
Application June 9, 1955, Serial No. 514,327
6 Claims. (Cl. 211—30)

This invention relates to hat holders and more particularly to a device that is convenient and readily adaptable for use in automobiles and suited for ready attachment as to support a hat either from a sun visor or an automobile window.

The present invention relates to a hat holder device that is simple in fabrication and yet may readily be secured to different sites in an automobile for securely retaining a hat in an automobile.

In accordance with the present invention there is provided a hat support conveniently formed of two elements, the first of which is an elongated metallic strap formed at one end thereof in two hooks extending back along either side. The strap member also is formed as a single hook at the other end thereof. An elongated curved resilient member in the form of a half oval is secured to the single hook at a point intermediate the ends of the half oval and is adapted to maintain the oval shaped arms substantially parallel to the length of the elongated frame.

For a further understanding of the present invention reference may now be had of the following description taken in conjunction with the accompanying drawings in which:

Fig. 1 is a front view of the present invention; and
Fig. 2 is a side view thereof.

Referring to the drawings there is illustrated an elongated frame member 10 formed from sheet metal strip which conveniently is about one and one-half inches in width and about twelve (12) inches long. One end is stamped to provide two tabs. A first tab 11, a single center section of the strip 10, is folded back along the strip so as to be parallel thereto to form a hook. The second tab 12 is folded along member 10 on the side thereof opposite tab 11 to form a second hook. Hook 11 is formed snugly to fit over the upper edge of an automobile window glass 13 there conveniently to be mounted. Preferably tab 11 is resilient as to resist twisting forces that might be placed thereon and to retain the unit securely in place.

The hook formed by tab 12 is of such dimensions as to readily fit over an automobile sun visor, and as shown in Fig. 2 is hooked onto a sun visor 15.

The end of member 10 opposite tabs 11 and 12 is bent as to form a hook 16 of substantially larger dimensions than those formed by tabs 11 and 12 and more particularly is of such size as to accommodate the brim of a hat. The upper extremity of hook 16 as shown in the drawings is folded back on itself to form a connection with oval-shaped hat-supporting element 20.

The hat supporting element 20 comprises an elongated slim rod preferably of resilient material, such as steel, formed generally in the shape of a half-oval. The center point of the half-oval is provided with a convolution 21 which extends radially away from the center of the oval. The convolution 21 is positioned inside the U-shaped end of the hook 16. It is securely fastened to the U-shaped end of hook 16 as by pressing or swedging the hook 16 around convolution 21. Alternatively the connection between the oval 20 and hook 16 may be provided by welding. By such means the frame 10 is firmly secured to the oval 20 in position to accommodate the crown of a man's hat such as shown (dotted) in Fig. 2.

As shown in Fig. 1, the hat holder may be supported by the upper edge of an automobile window as by the hook tab 11. Alternately the holder may be positioned with hook tab 12 engaging the edge of a sun visor 15 with the body of the metallic strip 10 on one side of the visor 15 and the oval 20 on the other side thereof. Thus positioned the sun visor may be rotated about its supporting axis 25 as in the direction of arrow 26 to position the hat near the ceiling or roof of the automobile in which position it does not impede vision or movement of the occupants of an automobile. Used in either mode above described, the surface of the frame or strip 10 bears against an adjacent plane surface to maintain the position of the hat and generally to stabilize the hat support. In Fig. 1, for example, the frame 10 bears against the window glass and tab 11 is thus required only to support the weight of the hat.

In Fig. 2, tab 12 positions the hat holder on the sun visor 15 but the surface of the frame 10 resting on the surface of visor 15 bears the weight placed thereon and stabilizes the hat support.

While the hat support above described and illustrated in the drawings is referred to as made of metal, but it will be apparent that plastic may also be employed. In any case, a broad flat section adjacent the supporting hooks is preferred in order to incorporate stability to the holder in bearing against mounting surfaces.

What is claimed is:

1. An automobile hat holder comprising a half-oval support adapted to receive the crown of a hat, a unitary flat rectangular frame member rigidly secured at one end thereof midway between the ends of said support and extending away from the mouth of said support in substantially the same plane thereof a distance equal or greater than the width of the brim of said hat and then extending back parallel to and spaced from said support to a point approximately even with said ends, two hook means on said frame member at the end opposite said support, one hook extending from said member toward said support and one extending away from said support.

2. The combination set forth in claim 1 in which said half oval support is formed of a resilient metallic rod and secured to one end of said frame member by swedging said frame member over the central portion of said half oval.

3. The combination set forth in claim 2 in which a radially extending convolution is provided in said half oval at said central portion.

4. The combination set forth in claim 1 in which said half oval is welded to the end of said frame member over a substantial length of the periphery of said half oval at the center thereof.

5. The combination set forth in claim 1 in which said hooks are formed by longitudinally slitting the metallic end portion of said frame member to permit opposed bending thereof.

6. The combination set forth in claim 1 in which said hook means are formed on said frame member by slitting a tongue from a central section of the metallic end portion of said frame member wherein said tongue is bent from said frame member in a first direction and the portion surrounding said tongue is bent in an opposed direction from said frame member.

References Cited in the file of this patent

UNITED STATES PATENTS

| | | |
|---|---|---|
| 61,633 | Post | Jan. 29, 1867 |
| 1,681,552 | Mount | Aug. 21, 1928 |
| 1,730,959 | Warfield | Oct. 8, 1929 |
| 1,985,961 | Switzer | Jan. 1, 1935 |
| 2,108,678 | Kulhawy | Feb. 15, 1938 |
| 2,461,178 | Reinke | Feb. 8, 1949 |
| 2,643,773 | Nicholson | June 30, 1953 |
| 2,659,489 | Searles | Nov. 17, 1953 |
| 2,699,263 | Ore | Jan. 11, 1955 |